(12) United States Patent
Lau et al.

(10) Patent No.: US 8,593,022 B2
(45) Date of Patent: Nov. 26, 2013

(54) ELECTRIC MOTOR WITH HEAT DISSIPATION STRUCTURE

(75) Inventors: James Ching Sik Lau, Hong Kong (CN); Xiao Jun Yang, Shenzhen (CN); Chun Kei Yu, Hong Kong (CN)

(73) Assignee: Johnson Electric S.A., Murten (CH)

( * ) Notice: Subject to any disclaimer, the term of this patent is extended or adjusted under 35 U.S.C. 154(b) by 119 days.

(21) Appl. No.: 12/981,250

(22) Filed: Dec. 29, 2010

(65) Prior Publication Data

US 2011/0156511 A1    Jun. 30, 2011

(30) Foreign Application Priority Data

Dec. 29, 2009   (CN) .......................... 2009 1 0238809
Jan. 27, 2010   (CN) .......................... 2010 1 0110588

(51) Int. Cl.
*H02K 9/06*      (2006.01)
*H02K 3/34*      (2006.01)

(52) U.S. Cl.
USPC .............. 310/62; 310/60 R; 310/63; 310/215

(58) Field of Classification Search
USPC .................................... 310/62, 63, 215, 60 R
See application file for complete search history.

(56) References Cited

U.S. PATENT DOCUMENTS

| | | | | |
|---|---|---|---|---|
| 3,848,145 A | * | 11/1974 | Goebel et al. | 310/60 R |
| 4,250,417 A | * | 2/1981 | Arnold | 310/62 |
| 5,081,384 A | * | 1/1992 | Rausch | 310/63 |
| 5,196,747 A | * | 3/1993 | Kress et al. | 310/89 |
| 5,280,210 A | * | 1/1994 | Kress et al. | 310/158 |
| 2004/0163831 A1 | * | 8/2004 | Ortt et al. | 173/217 |
| 2005/0104459 A1 | * | 5/2005 | Jones | 310/63 |
| 2006/0175913 A1 | * | 8/2006 | Hempe et al. | 310/50 |
| 2009/0224626 A1 | * | 9/2009 | Eppler et al. | 310/215 |

FOREIGN PATENT DOCUMENTS

JP          2008290218 A    * 12/2008

OTHER PUBLICATIONS

Machine Translation JP2008290218 (2008).*
Web Page (http://www.cgsnetwork.com/convfactorstable.html).*

* cited by examiner

*Primary Examiner* — Tran Nguyen
*Assistant Examiner* — Jose Gonzalez Quinones
(74) *Attorney, Agent, or Firm* — Muncy, Geissler, Olds & Lowe, PLLC

(57) ABSTRACT

An electric motor has a stator and a rotor rotatably mounted in the stator. The rotor has a shaft and a fan mounted on the shaft. A air guide structure with an axial extension portion is arranged at one end of the stator adjacent the fan. The gap between the axial extension portion and the fan in the axial and/or radial direction of the motor is narrow in order to reduce air swirl generated by air flowing from the outlet of the fan to the inlet of the fan through the gap. Preferably, the width of the gap is larger than 0.05 mm and smaller than 2.0 mm. The cooling efficiency of the fan is increased and the performance of the motor is improved.

12 Claims, 3 Drawing Sheets

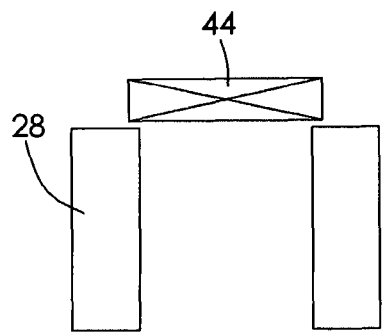
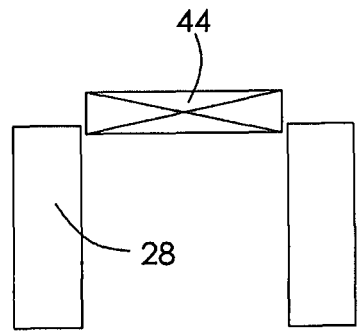
FIG. 9    FIG. 10
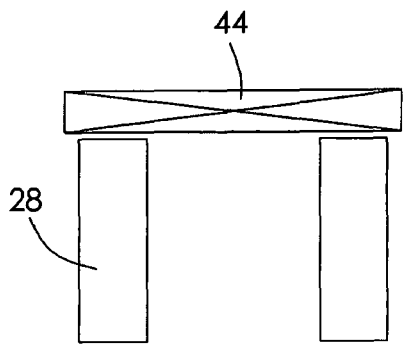
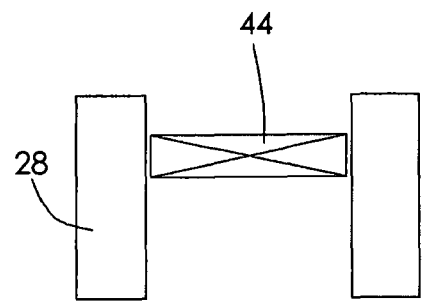
FIG. 11    FIG. 12
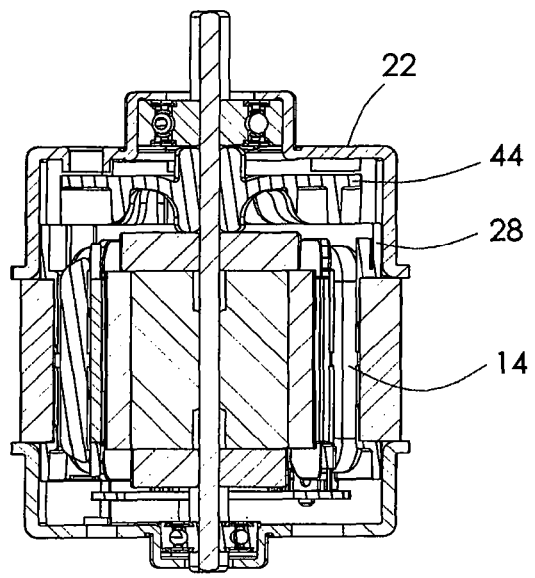
FIG. 13

ELECTRIC MOTOR WITH HEAT DISSIPATION STRUCTURE

CROSS REFERENCE TO RELATED APPLICATIONS

This non-provisional patent application claims priority under 35 U.S.C. §119(a) from Patent Application No. 200910238809.7 filed in The People's Republic of China on Dec. 29, 2009 and Patent Application No. 201010110588.8 filed in The People's Republic of China on Jan. 27, 2010.

FIELD OF THE INVENTION

This invention relates to an electric motor and in particular, to a small electric motor with a cooling fan.

BACKGROUND OF THE INVENTION

Generally, small electric motors, such as PMDC motors and electronically commutated DC motors comprise a stator and a rotor installed in the stator. Two end caps are arranged at the axial ends of the stator. The two end caps have bearings in which the shaft is journalled. To remove heat from the motor, a fan is fixed to the shaft and located at the inner side of one end cap between the stator core and the end cap.

However, to increase motor power while reducing the physical size of the motor, the problem of heat dissipation has become more prominent.

Hence there is a desire for an electric motor with improved cooling.

SUMMARY OF THE INVENTION

Accordingly, in one aspect thereof, the present invention provides an electric motor comprising: a stator; a rotor rotatably mounted in the stator and having a shaft; a fan mounted on the shaft, the fan having an inlet and an outlet; a air guide structure with an axial extension portion is arranged at one end of the stator adjacent to the fan; and a gap is formed between the axial extension portion and the fan, wherein the gap has a width that is sufficiently narrow to restrict air flowing from the outlet of the fan to the inlet of the fan through the gap.

Preferably, the width of the gap is larger than 0.05 mm and smaller than 2.0 mm.

Preferably, the stator further comprises a stator core, windings wound about the stator core and an end protector for insulating the core from the windings, the end protector being integrally formed with the axial extension portion of the air guide structure.

Preferably, the stator further comprises a stator core, windings wound about the stator core, and an end protector for insulating the core from the windings, and wherein the end protector further comprises an end portion extending radially and at least partially covering an axial end of teeth of the stator core.

Preferably, the stator comprises two end caps located at axial ends thereof, and the fan is located adjacent an outer side of one of the two end caps.

Preferably, the stator further comprises a stator core and a plurality of locking members extending through the interior of the stator core for fixing the two end caps to the stator core.

Preferably, the stator comprises two end caps located at axial ends thereof, and the fan is located adjacent an inner side of one of the two end caps.

Preferably, the fan is a centrifugal fan located at the end of the axial extension portion of the air guide structure and the gap is formed between the axial extension portion and the fan in the axial direction of the motor.

Preferably, an end of the axial extension portion adjacent to the fan is trumpet-shaped.

Preferably, the fan has a plurality of vanes and a chamfer is formed at one end of the vanes adjacent to the axial extension portion of the air guide structure.

Preferably, the fan is an axial fan located adjacent an inner side of the axial extension portion of the air guide structure, and the gap is formed between the axial extension portion and the fan in the radial direction of the motor.

Preferably, the fan is an axial fan located at the outer side of the end of the axial extension portion of the air guide structure and the outer radius of the fan is larger than the outer radius of the axial extension portion of the air guide structure.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

FIGS. 9 and 10 are schematic views of relative positions between a centrifugal type fan and the air guide structure in different embodiments;

FIGS. 11 and 12 are schematic views of relative positions between an axial type fan and the air guide structure in different embodiments; and FIG. 13 is an axial sectional view of a motor according to another embodiment.

DETAILED DESCRIPTION OF THE PREFERRED EMBODIMENTS

Figure 1:
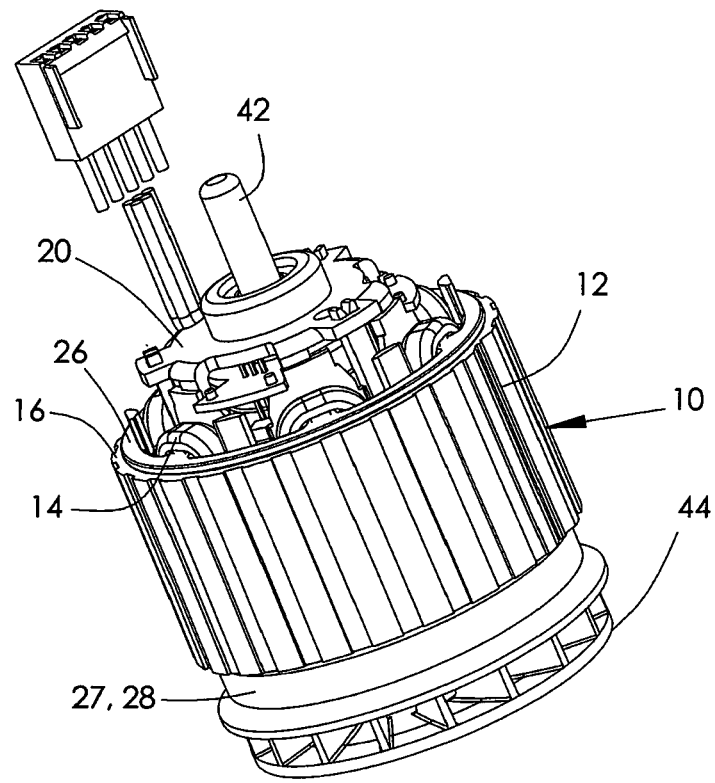
FIG. 1 is a perspective view of a motor in accordance with a first preferred embodiment of the present invention.
Figure 3:
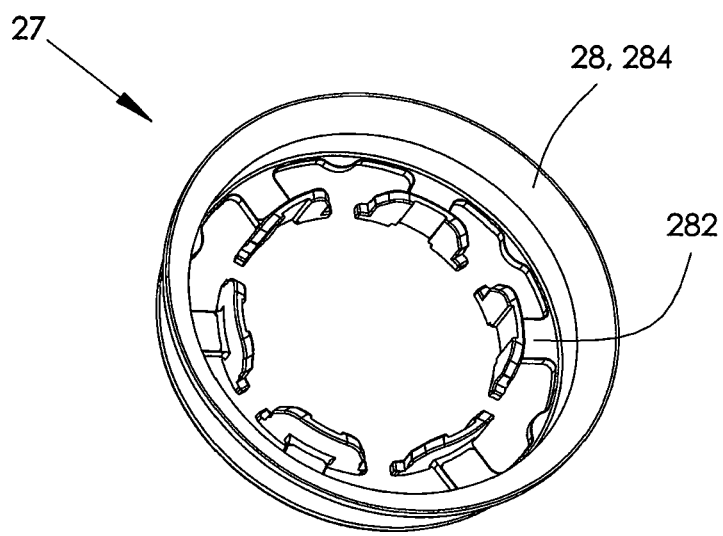
FIG. 3 is a perspective view of a air guide structure, being a part of the motor in FIG. 1.
Figure 2:
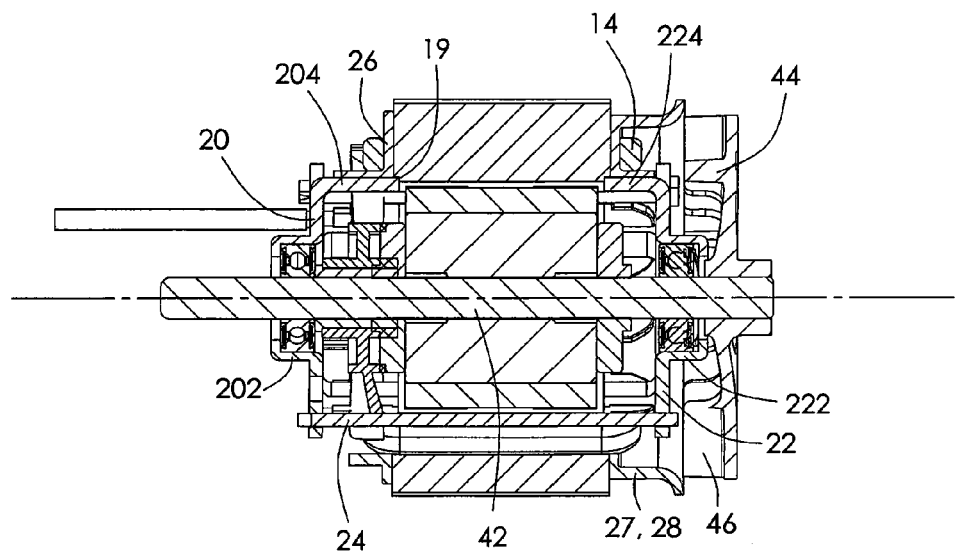
FIG. 2 is an axial sectional view of the motor of FIG. 1.

FIGS. 1, 2 and 3 show a motor according to a preferred embodiment of the present invention. The motor comprises a stator 10 and a rotor 40 rotatable relative to the stator. The rotor 40 comprises a shaft 42. A fan 44 is mounted on one end of the shaft 42. The fan 44 is located at the axial outer side of the end cap 22.

The stator 10 comprises a stator core 12 made of magnetic permeable material such as iron and windings 14. The stator core 12 comprises a yoke 16 and a plurality of teeth extending inwardly from the yoke. The windings 14 are wound around the teeth. A plurality of slots (not labeled) are axially formed in the outer surface of the yoke 16 for increasing heat dissipation areas of the yoke 16.

The stator 10 further comprises two end caps 20, 22 and a plurality of locking members 24 for fixing the end caps 20, 22. The locking members 24 extend through the interior of the stator. Preferably, the locking members 24 extend through respective slots formed between adjacent teeth on the inner side of the yoke 16. The stator 10 further comprises two end protectors 26, 27 arranged at the axial ends of the stator core 12 respectively for protecting the windings from the sharp edges of the stator core and for insulating the stator core 12 from the windings 14.

Each end cap 20, 22 comprises an end portion 202, 222 for supporting a shaft 42 of the rotor 40 and an axial extension portion 204, 224 extending axially from the end portion 202, 222. Inner portions of the two axial ends of the teeth of the stator core are recessed relative to the other portions of the teeth such that steps 19 are formed. The ends of the axial extension portions 204, 224 of the end caps 20, 22 abut against the steps 19 to position the axial extension portions 204, 224 in the axial and radial directions. Optionally, if the inner cylindrical surfaces of the end protectors 26, 27 have sufficient precision, the ends of the axial extension portions 204, 224 may be radially positioned by the inner cylindrical surfaces of the end protectors 26, 27 and axially positioned by the ends of the axial extension portions 204, 224 of the end caps 20, 22.

The end protector 27 adjacent the fan 44, is integrally formed with a air guide structure 28. The end protector has an end portion 282 and an axial extension portion 284 extending axially from the outer periphery of the end portion 282. The end portion 282 comprises several radial extension portions corresponding to the teeth of the stator core. The radial extension portions are closely attached to one axial end of the teeth of the stator core to insulate the windings 14 from the core. The axial extension portion 284, which forms the air guide structure 28, is tubular and surrounds the outer periphery of the end cap 22. While the tubular portion of the air guide structure preferably has a right circular cross section, other cross sectional shapes such as elliptical, square, rectangular, etc. are possible so as to generally match the shape of the stator core. For example, if the stator is square, the axial extension portion 284 may be a tubular with a square cross section. The end of the axial extension portion 284 remote from the end portion 282 extends outwards in radial directions so that a flared or trumpet-shaped end is formed.

The fan 44 is a centrifugal fan comprising several vanes 46 extending outwardly in the radial direction. The vanes 46 face the air guide structure 28. A narrow axial gap is formed between the ends of the vanes 46 and the end of the axial extension portion 284 of the air guide structure 28. Preferably, the width of the gap is larger than 0.05 mm and smaller than 2.0 mm. When the motor is in operation, airflow generated by the fan 44 flows into the slots formed between adjacent teeth of the stator and the space between the stator and the rotor, then flows out from the end of the motor adjacent to the fan and through the airflow passage formed between the vanes 46 of the fan 44 to thereby cool the rotor core, magnets (not shown), and the stator windings 14. Alternatively, the air may flow the opposite direction. The narrow axial gap formed between the ends of the vanes 46 and the end of the axial extension portion 284 of the air guide structure 28 can prevent the air from flowing from the higher-pressure region at the outlet side of the fan 44 to the lower-pressure region at the inlet side of the fan 44. There must be a gap between the fan and the air guide to allow the fan to rotate without contacting the air guide. However, usually there is considerable recirculation or cross flow of air from the outlet of the fan to the inlet of the fan which reduces the volume of air flowing through the motor. By restricting this cross flow of air more air is drawn through the motor. Thus, the cooling efficiency of the fan 44 is increased and performance of the motor is improved.

Optionally, the air guide structure 28 can be formed separately from the end protector 27 and comprise an axial end portion extending radially and an axial extension portion extending axially from the periphery of the axial end portion. The axial end portion is attached to the end protector.

Figure 4:
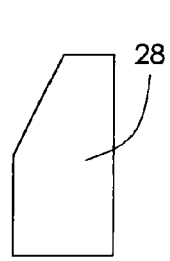
FIG. 4 is an axial sectional view of the axial extension portion of the air guide structure in accordance with a second embodiment of the present invention.
Figure 5:
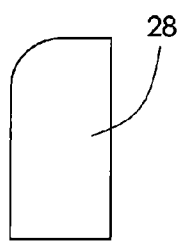
FIG. 5 is an axial sectional view of the axial extension portion of the air guide structure in accordance with another embodiment of the present invention.

The trumpet-shaped end of the air guide structure 28 can also be formed by such means as cutting the inner surface of the end of the axial extension portion 284 of the air guide structure 28 into a chamfer configuration which can be convex, concave or a straight surface as shown in FIG. 4 and FIG. 5. The trumpet-shaped end formed in the air guide structure 28 can help to reduce the generation of air swirl.

Figure 6:
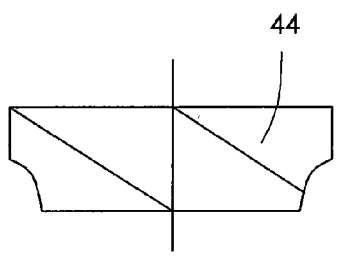
FIGS. 6 to 8 are schematic axial sectional views of the fan in different embodiments.
Figure 7:
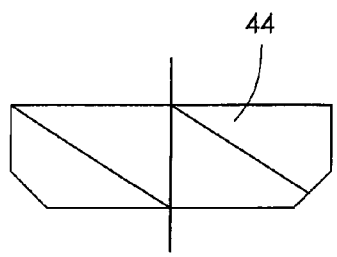
Figure 8:
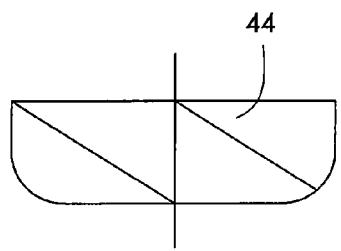

The ends of the vanes 46 of the fan 44 adjacent to the axial extension portion 284 of the air guide structure 28 can also be cut into a chamfer configuration which can be straight, convex or concave surface as shown in FIGS. 6 to 8.

The fan 44 and the air guide structure 28 can have various mounting positions. For example, the fan 44 may be totally located out of the axial extension portion 284 of the air guide structure 28 as shown in FIG. 9. The fan 44 may be partly located in the axial extension portion 284 of the air guide structure 28 as shown in FIG. 10.

Optionally, the fan 44 may be an axial fan. The whole fan may be totally located out of the axial extension portion 284 of the air guide structure 28. An axial gap is formed between the axial end of the fan 44 and the axial end face of the axial extension portion 284. The outer radius of the fan 44 is larger than the outer radius of the stator core as shown in FIG. 11. Thus, of the airflow generated by the fan 44, some air flows through the gaps between adjacent teeth of the stator while some air flows over the outer side of the stator core 12 to cool the stator core. When the fan 44 is an axial fan, it also may be totally located within the axial extension portion 284 of the air guide structure 28 with a radial gap formed between the outer peripheral of the fan 44 and the inner surface of the axial extension portion 284, as shown in FIG. 12.

Optionally, the fan 44 and the air guide structure 28 may be arranged at the inner side of the end cap 22, as shown in FIG. 13.

Optionally, both axial and radial gaps may be formed between the axial extension portion 284 of the air guide structure 28 and the fan.

It should be noted that the axial extension portion 284 of the air guide structure 28 is not limited to only extending in the axial direction of the motor. It may extend in a direction inclined relative to the axis of the motor.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, it should be understood that the present invention is not limited to electronically commutated motors. The present invention is also applicable to other types of motors such as universal motors, PMDC motors and the like.

The invention claimed is:

1. An electric motor comprising:
   a stator;
   a rotor rotatably mounted in the stator and having a shaft;

a fan mounted on the shaft, the fan having an inlet and an outlet;

an air guide structure with an axial extension portion arranged at one end of the stator adjacent to the fan; and a gap formed between the axial extension portion and the fan, wherein the gap has a width that is sufficiently narrow to restrict air flowing from the outlet of the fan to the inlet of the fan through the gap;

wherein the stator further comprises a stator core, windings wound about the stator core and an end protector for insulating the core from the windings, the end protector being integrally formed with the axial extension portion of the air guide structure.

2. The motor of claim 1, wherein the width of the gap is larger than 0.05 mm and smaller than 2.0 mm.

3. The motor of claim 1, wherein the stator further comprises a stator core, windings wound about the stator core, and an end protector for insulating the core from the windings, and wherein the end protector further comprises an end portion extending radially and at least partially covering an axial end of teeth of the stator core.

4. The motor of claim 1, wherein the stator comprises two end caps located at axial ends thereof, and the fan is located adjacent an outer side of one of the two end caps.

5. The motor of claim 1, wherein the stator comprises two end caps located at axial ends thereof, and the fan is located adjacent an inner side of one of the two end caps.

6. The motor of claim 1, wherein the fan is a centrifugal fan located at the end of the axial extension portion of the air guide structure and the gap is formed between the axial extension portion and the fan in the axial direction of the motor.

7. The motor of claim 6, wherein an end of the axial extension portion adjacent to the fan is trumpet-shaped.

8. The motor of claim 7, wherein the fan has a plurality of vanes and a chamfer is formed at one end of the vanes adjacent to the axial extension portion of the air guide structure.

9. The motor of claim 1, wherein the fan is an axial fan located adjacent an inner side of the axial extension portion of the air guide structure, and the gap is formed between the axial extension portion and the fan in the radial direction of the motor.

10. The motor of claim 1, wherein the fan is an axial fan located at the outer side of the end of the axial extension portion of the air guide structure and the outer radius of the fan is larger than the outer radius of the axial extension portion of the air guide structure.

11. The motor of claim 4, wherein the stator further comprises a stator core having a central opening defining an interior space and a plurality of locking members extending through the interior space of the stator core for fixing the two end caps to the stator core.

12. The motor of claim 1, wherein the axial extension portion extends continuously along the axial and peripheral directions of the stator.

* * * * *